(12) United States Patent
Sharony et al.

(10) Patent No.: US 7,778,649 B2
(45) Date of Patent: Aug. 17, 2010

(54) SYSTEM AND METHOD FOR ASSET LOCATION IN WIRELESS NETWORKS

(75) Inventors: Jacob Sharony, Dix Hills, NY (US); Joseph Katz, Stony Brook, NY (US)

(73) Assignee: Symbol Technologies, Inc., Holtsville, NY (US)

( * ) Notice: Subject to any disclaimer, the term of this patent is extended or adjusted under 35 U.S.C. 154(b) by 384 days.

(21) Appl. No.: 12/062,725

(22) Filed: Apr. 4, 2008

(65) Prior Publication Data

US 2008/0182593 A1 Jul. 31, 2008

Related U.S. Application Data

(63) Continuation of application No. 11/635,099, filed on Dec. 7, 2006, now Pat. No. 7,373,154, which is a continuation of application No. 11/067,127, filed on Feb. 25, 2005, now Pat. No. 7,174,172.

(51) Int. Cl.
*H04W 24/00* (2009.01)
(52) U.S. Cl. .................................. 455/456.1; 455/456.5
(58) Field of Classification Search .............. 455/456.1, 455/456.2, 456.3, 456.5, 456.6; 370/338, 370/328; 340/539.13, 825.49
See application file for complete search history.

(56) References Cited

U.S. PATENT DOCUMENTS

| | | | |
|---|---|---|---|
| 6,865,395 B2 * | 3/2005 | Riley | 455/456.1 |
| 7,174,172 B2 * | 2/2007 | Sharony et al. | 455/456.1 |
| 7,373,154 B2 * | 5/2008 | Sharony et al. | 455/456.1 |
| 2003/0235172 A1 * | 12/2003 | Wood | 370/338 |
| 2004/0162084 A1 * | 8/2004 | Wang | 455/456.1 |
| 2005/0037775 A1 * | 2/2005 | Moeglein et al. | 455/456.1 |
| 2005/0251326 A1 * | 11/2005 | Reeves | 701/200 |
| 2006/0009240 A1 * | 1/2006 | Katz | 455/457 |
| 2007/0247366 A1 * | 10/2007 | Smith et al. | 342/464 |

* cited by examiner

*Primary Examiner*—George Eng
*Assistant Examiner*—Brandon J Miller

(57) ABSTRACT

Described is a system and method for tracking an asset. The system may include a plurality of wireless access points and a computing arrangement communicating with the access points. The arrangement determines a location area of the device as a function of first data and a location of each of at least three access points of the plurality of the access points. The first data includes at least one of first signal strength data and second signal strength data. The first signal strength data is indicative of a strength of a first signal transmitted by the device and received by the at least three access points. The second signal strength data is indicative of a strength of a second signal transmitted by the at least three access points and received by the device. The location area is an area within a predetermined reception range of the at least three local access points. The arrangement determines the location of the device within the location area as a function of second data and a further location of each of the at least three further access points of the plurality of access points. The second data is indicative of a travel time of a third signal from the device to each of the at least three further access points.

20 Claims, 2 Drawing Sheets

SYSTEM AND METHOD FOR ASSET LOCATION IN WIRELESS NETWORKS

PRIORITY CLAIM

This application is a Continuation application of U.S. patent application Ser. No. 11/635,099 filed on Dec. 7, 2006 now U.S. Pat. No. 7,373,154 entitled "System and Method for Asset Location in Wireless Networks", which is a Continuation of Ser. No. 11/067,127, filed Feb. 25, 2005, U.S. Pat. No. 7,174,172 issued on Feb, 6, 2007 entitled "System and Method for Asset Location in Wireless Networks". The entire disclosures of the prior applications are considered as being part of the disclosure of the accompanying application and hereby expressly incorporated by reference herein.

BACKGROUND

A conventional asset tracking system often utilizes Radio Frequency ("RF") tags attached to assets (e.g., a computer, a mobile unit ("MU"), machinery, equipment, etc) to identify, locate or track such assets. One of the major benefits of such an RF tracking system is that a line of sight ("LOS") between an RF reader or interrogator and the RF tag is not required for communication. This allows a large group of assets to be entered into the RF tracking system without any significant handling.

There are a number of ways to determine the location of the RF tag and/or the MU. For example, the location of the RF tag may be determined by measuring a Time Difference Of Arrival ("TDOA") of a response signal. In particular, the location of the RF tag may be determined by comparing the time when a response signal to the RF tag arrives at three or more transceivers in different locations, The location of the RF tag may also be determined using a power measurement reading of the response signal (i.e., a Received Signal Strength Indication ("RSSI") method). RSSI utilizes the intensity of the response signal and compares it with predetermined geographically marked points.

However, RSSI and TDOA each have different strengths and deficiencies. For example, RSSI is known to have limited accuracy in certain applications due to the dynamically changing environment (e.g., movement of objects, channel fading, etc) while TDOA may be largely affected by multipath effects (e.g., from walls and other objects in the scene). Therefore, there is a great need for an improved high-accuracy asset tracking system for locating remote or far-away assets.

SUMMARY OF THE INVENTION

Described is a system and method for tracking an asset. The system may include a plurality of wireless access points and a computing arrangement communicating with the access points. The arrangement determines a location area of the device as a function of first data and a location of each of at least three access points of the plurality of the access points. The first data includes at least one of first signal strength data and second signal strength data. The first signal strength data is indicative of a strength of a first signal transmitted by the device and received by the at least three access points. The second signal strength data is indicative of a strength of a second signal transmitted by the at least three access points and received by the device. The location area is an area within a predetermined reception range of the at least three local access points.

The arrangement determines the location of the device within the location area as a function of second data and a further location of each of the at least three further access points of the plurality of access points. The second data is indicative of a travel time of a third signal from the device to each of the at least three further access points.

DETAILED DESCRIPTION

Figure 1:
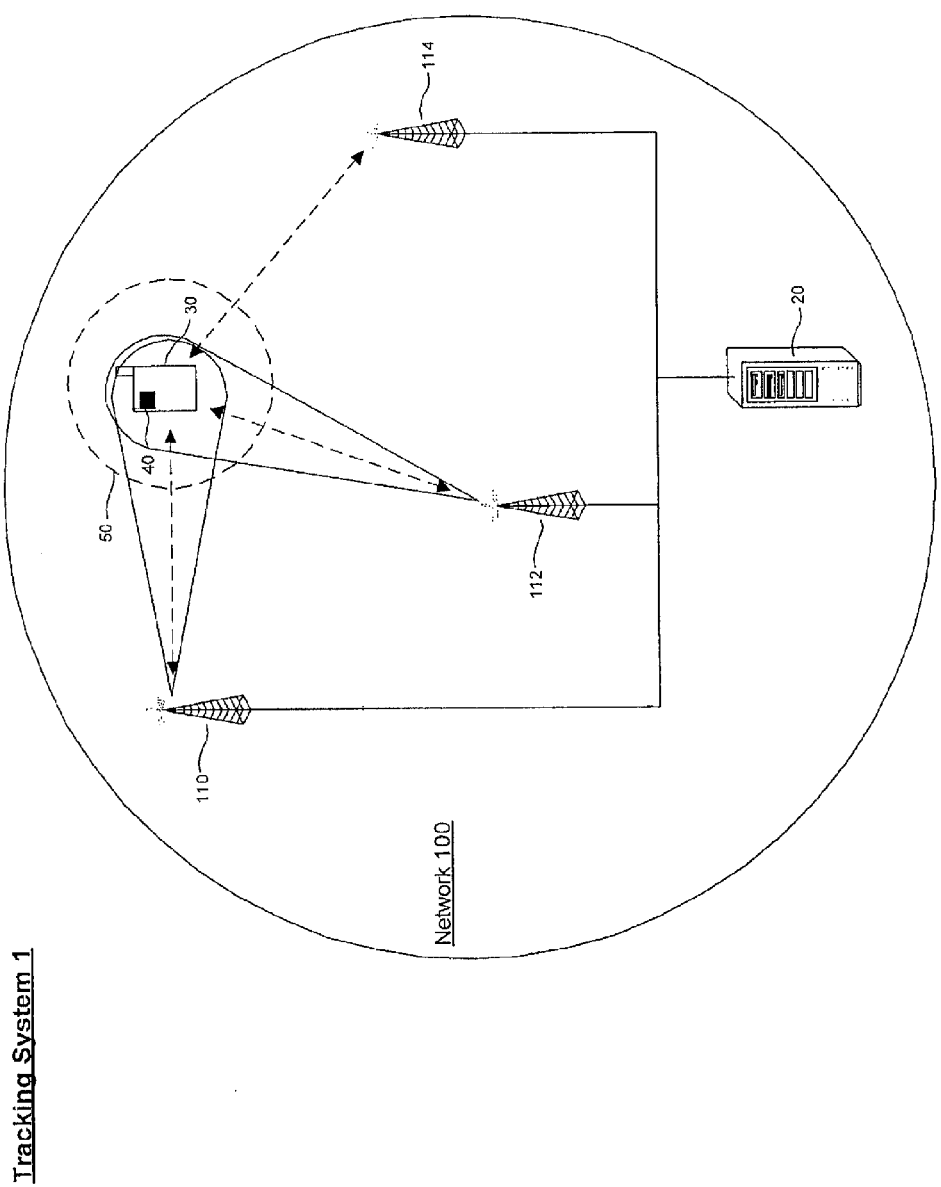
FIG. 1 shows an exemplary embodiment of an tracking system according to the present invention.

The present invention may be further understood with reference to the following description and the appended drawings, wherein like elements are referred to with the same reference numerals. An exemplary embodiment of the present invention is a system and method for locating assets (e.g., a mobile unit ("MU"), an RF tag, etc.) in a wireless communications network. The present invention provides for improved accuracy over conventional asset locating systems by employing an asset locating and tracking system and steered or switched signal beams. The present invention may be used, for example, in applications requiring accuracy in asset location and tracking, and for data communications featuring extended range and mobile power savings.

FIG. 1 shows an exemplary embodiment of a tracking system 1 according to the present invention. The tracking system 1 may be utilized in a wireless network 100, such as a wireless local area network ("WLAN"), which operates according to a communication protocol adopted by IEEE. Specifically, the WLAN and any wireless computing devices therein may utilize an 802.11 (e.g., 802.11b) communication protocol for conducting wireless communications. Those of skill in the art would understand that the tracking system 1 of the present invention may be utilized in an indoor environment (e.g., a warehouse, retail location, etc.), as well as an outdoor environment (e.g., parks, cities, etc.).

The wireless computing devices in the network 100 may include a plurality of access points ("APs") (e.g., APs 110, 112, and 114) in communication with a computing arrangement (e.g., a server 20). Each of the APs 110, 112, 114 may be a conventional wireless access point, and in one exemplary embodiment, each AP 110, 112, 114 includes a smart antenna (e.g., switched beam, adaptive array, etc.). As one of ordinary skill in the art will understand, the smart antenna may provide a steered and/or switched beam capability, such that the AP may dynamically direct a transmission/reception in response to an RF environment. That is, the AP may direct and/or switch to one or more beams aimed toward a predetermined location within the network 100.

According to the present invention, the APs 110, 112, 114 and the server 20 may work in conjunction to locate and track an asset within the network 100. In one exemplary embodiment of the present invention, the asset is a mobile unit ("MU") 30 which is located within an RF coverage area of at least one of the APs 110, 112, 114. The MU 30 may be any wireless computing device (e.g., PDA, scanner, cell phone, laptop, network card and PC, handheld computer, etc.). Though the exemplary embodiment of the present invention will be described with reference to the MU 30 as the asset, those of skill in the art would understand that the asset may include any object (e.g., device, good, animal) which may have an RF transmitter and/or an RF tag attached thereto. In addition, the MU 30 itself may include an RF tag 40 attached thereto.

As shown in FIG. 1, the server 20 may determine a location of the MU 30 within the network 100. The server 20 may instruct each of the APs 110, 112, 114 to initiate a coarse location operation. In one exemplary embodiment, the coarse location operation corresponds to location determination using an RSSI. In this manner, the coarse location operation may cause each AP 110, 112, 114 to transmit a signal to the MU 30. Each AP 110, 112, 114 may subsequently receive an acknowledgment signal from the MU 30, confirming receipt of the signal sent by the AP. In the acknowledgment signal, the MU 30 may transmit signal strength data which corresponds to a strength of the signal which was transmitted by each AP and received by the MU 30. Each AP 110, 112, 114 may further record signal strength data which corresponds to a strength of the acknowledgment signal received by each AP 110, 112, 114. According to the present invention, each AP 110, 112, 114 may include a receiver to conduct conventional wireless communication, and be equipped with a further receiver for tracking the asset, as will be described herein. Each AP may then forward one or both of the signal strength datum to the server 20. The server 20 may utilize the signal strength datum to determine a coarse location 50 of the MU 30 within the network 100.

In a further exemplary embodiment, each transmission from the MU 30 to each AP 110,112, 114 may include the signal strength data from a prior transmission which was received by the MU 30. Furthermore, each AP 110, 112, 114 may record and store (e.g., buffer) one or more signal strength datum from a prior transmission which was received thereby from the MU 30. In this embodiment, the server 20 does not have to wait for each AP 110, 112, 114 to transmit the signal to the MU 30 and receive the acknowledgment signal in return. The server 20 may receive the datum from the prior transmissions which are stored at each AP 110, 112, 114. Thus, upon a request from the server 20 to initiate the coarse location operation, each AP 110, 112, 114 may transmit the signal strength data from the prior transmission(s), which may include the signal strength data from the MU 30 and/or the AP, to the server 20.

Once the server 20 has determined the coarse location 50 of the MU 30 within the network 100, the server may instruct each AP 110, 112, 114 to initiate a fine location operation. In one exemplary embodiment, the fine location operation corresponds to location determination using a TDOA. In this manner, the server 20 may instruct each AP 110, 112, 114 to steer its beam or switch to a beam directed toward the coarse location 50 determined by the server 20. Alternatively, the server 20 may provide the coarse location 50 to each AP 110, 112, 114 which then directs the beam itself. Each AP 110, 112, 114 then waits to receive a signal from the MU 30 and determines a travel time for the signal. Each AP 110, 112, 114 then forwards each travel time to the server 20 which utilizes the travel times to determine a fine location of the MU 30 within the coarse location 50.

Figure 2:
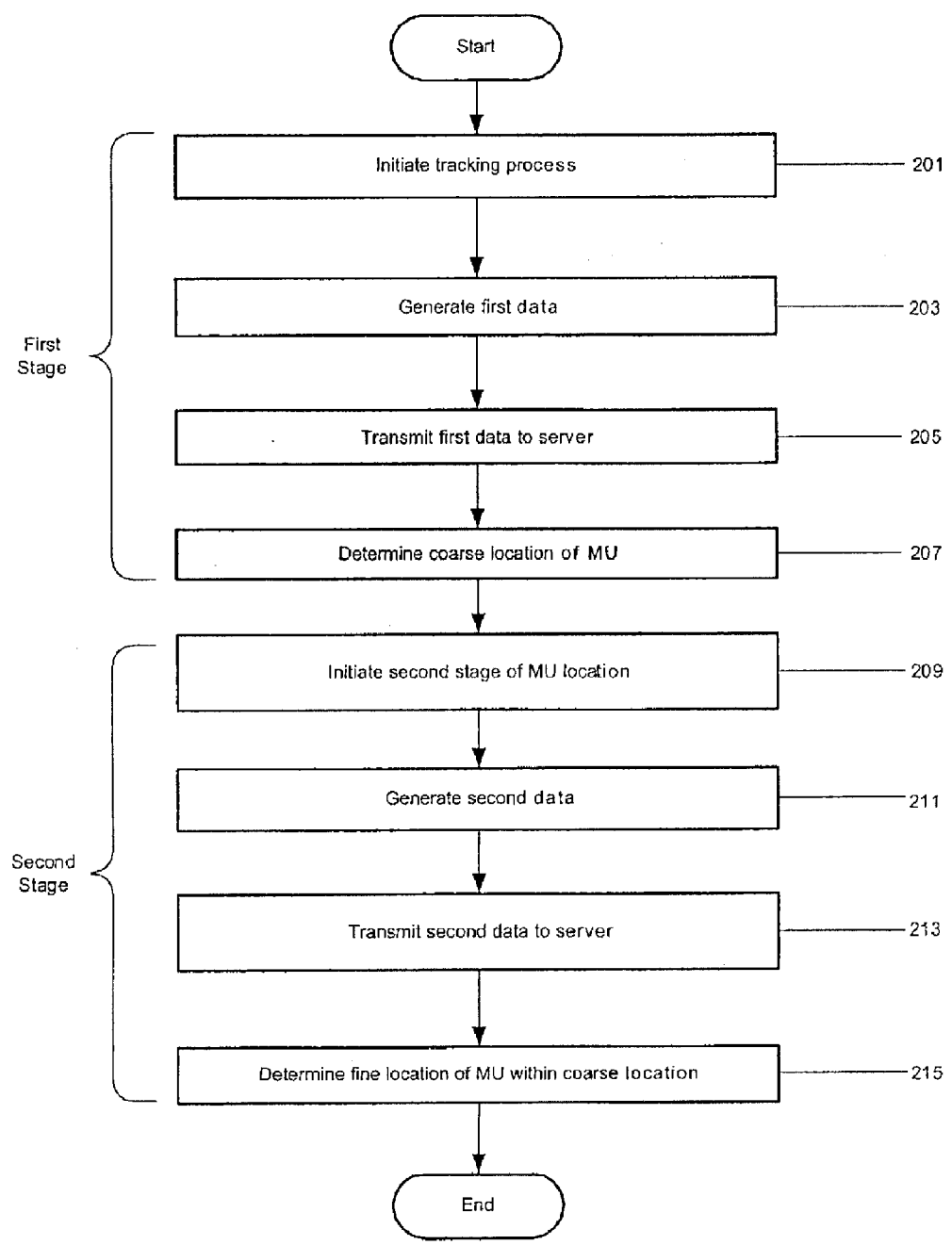
FIG. 2 shows an exemplary embodiment of a method according to the present invention.

FIG. 2 shows an exemplary embodiment of a method 200 for locating the asset within the network 100 according to the present invention. The method will be described with reference to the network 100, APs 110, 112, 114 and MU 30 shown in FIG. 1. Those skilled in the art will understand that other wireless systems having varying configurations, for example, different numbers of WLANs, APs and MUs, may also utilize and/or implement the exemplary method 200 described herein.

In one exemplary embodiment, steps 201-209 of the method 200 describe a first stage for determining the coarse location 50 (e.g., an approximate location or a location area) of the MU 30 using a Received Signal Strength Indication ("RSSI"). For example, the first stage (e.g., RSSI stage) may include a power measurement reading (e.g., a strength) of a signal by the MU 30 and/or the APs 110, 112, 114.

In step 201, the server 20 may initiate a tracking process of the MU 30. The tracking process may include the first stage for determining the coarse location 50 of the MU 30, and a second stage for determining the fine location of the MU 30 within the coarse location 50. In this embodiment, the server 20 may respond to a request to determine the location of the MU 30, or the server may automatically determine the location of the MU 30 at predetermined intervals (e.g., every 2 hours) or upon certain conditions (e.g., when the MU 30 is powered on). In a further exemplary embodiment, an operator or proprietor of the network 100 may initiate the tracking process using the server 20. In yet a further embodiment, a further MU may initiate the tracking process. For example, a user of the further MU may desire to know where the MU 30 is within the network. Similarly, the MU 30 or a user thereof may desire to know a certain location within the network 100 (e.g., a recharging station, a product within a store, etc.). Thus, the server 20, the operator of the network 100 and/or the MU 30 may initiate the tracking process.

In step 203, first data is generated. The first data may include first signal strength data ("FSSD") and/or second signal strength data ("SSSD"). The FSSD is indicative of a strength of a first signal which is transmitted by the MU 30 and received by at least three APs including, e.g., APs 110, 112, 114. The SSSD is indicative of a strength of a second signal which is transmitted by at least three APs (e.g., APs 110, 112, 114) and received by the MU 30. The FSSD and/or the SSSD may include the RF tag 40 identification, an identifier of the MU 30, etc.

In one exemplary embodiment, the server 20 may first determine the at least three APs which are in a communicable range with the MU 30. That is, the server 20 may review prior signal strength data and/or location data from prior tracking processes to identify those APs which are in a proximity of the MU 30. In a further exemplary embodiment, the server 20 may instruct a plurality of APs to gather the first data. If more than three APs respond to the server 20 with the first data, the server 20 preferably chooses the three APs with a highest RSSI. In either of these embodiments, the first data may further include a location of each AP 110, 112, 114 within the network 100.

In step 205, the APs 110, 112, 114 transmit the first data to the server 20. In step 207, the server 20 processes the FSSD and/or the SSSD to determine the course location 50 (e.g., a location area) of the MU 30 and/or the RF tag 40 within the network 100. In determining the location of the MU 30, the server 20 may utilize the intensity of the FSSD and/or the SSSD, as compared with one or more predetermined geographically marked locations or points (e.g., within the network 100). For example, the network 100 may include a certain number of marked points, each having a measured power reading. Preferably, the marked points are static or are less likely to move with respect to the APs 110, 112, 114, thereby allowing the server 20 to compare the FSSD and/or the SSSD with a consistent value(s).

The server 20 may then compare the FSSD and/or the SSSD to the measured power readings of the marked points. In one embodiment, the server 20 and/or the APs 110, 112, 114 may store one or more of the measured power readings of the marked points. Alternatively or additionally, the server 20 may instruct the APs 110, 112, 114 to gather new power readings from the marked points at the initiation of the tracking process and/or at a predetermined time interval. Based on this comparison, the coarse location 50 of the MU 30 may be determined.

Once the location area or the coarse location 50 of the MU 30 is determined, a fine location may be determined during a second stage of the method 200 via a Time Difference Of Arrival ("TDOA") method (steps 209-215). In particular, the fine location (e.g., location of the MU 30 within the coarse location 50) may be determined using the TDOA method via a steered signal from at least three of the APs 110, 112, 114 within the network 100. Those of skill in the art would understand that only the first stage may be necessary (e.g., determining the coarse location 50) if, for example, the network 100 covers a relatively small area (e.g., a department within a retail store).

In step 209, the server 20 may initiate the second stage of the tracking process of the MU 30. As understood by those skilled in the art, the server 20 may not need to initiate the second stage of the tracking process, because the process may continue until the fine location of the MU 30 is determined. That is, the server 20 may simply initiate the tracking process only once, and, as a result, output/determine the fine location of the MU 30 within the network 100.

In step 211, second data is generated. In one exemplary embodiment, the second data may be collected by the APs 110, 112, 114 according to the TDOA mechanism described above. That is, each AP 110, 112, 114 and/or the server 20 may calculate the travel time of a signal which was transmitted by the MU 30 and received by each AP 110, 112, 114. In a further exemplary embodiment, the server 20 may indicate the coarse location 50 of the APs 110, 112, 114, and instruct each to direct (or switch to) its beam which is pointed thereto. Thus, the use of the smart antenna at each AP 110,112,114 may provide for a more precise determination of the fine location of the MU 30.

The second data may further include the location of the APs 110, 112, 114, as well as a plurality of data including, for example, the RF tag 40 identification, an identifier of the MU 30, instructions to the MU 30 to activate a response mode, etc.

In step 213, the APs 110, 112, 114 transmit the second data to the server 20. In step 213, the server 20 processes the second data to determine the fine location of the MU 30. In this manner, the server 20 utilizes a software application which includes, for example, a triangulation algorithm that calculates the fine location of the MU 30 within the coarse location 50. The server 20 may further compare the fine location to TDOA data generated by the marked points within the network 100. This comparison may provide a more precise fine location for the MU 30.

Advantages of the present invention include power savings in the MU 30 and/or the RF tag 40. Furthermore, the tracking process may provide for higher accuracy in location determination due to reduced multipath from beam steering/switching. The present invention may be employed in wireless networks without requiring hardware or software modifications to the MU 30 and/or the RF tag 40.

A further advantage of the present invention is the enhanced detection of rogue MUs and APs within the network 100. For example, introduction and/or entry of an MU and/or an AP into the network 100 may require a hardware and/or firmware change to respond to requests by the server 20. Thus, the present invention may provide for improved location-based security and network integrity.

The present invention has been described with reference to an embodiment having the MU 30, the RF tag 40, the network 100, and APs 110, 112, 114. One skilled in the art would understand that the present invention may also be successfully implemented, for example, for a plurality of MU's 30, RF tags 40, APs 110, 112, 114 and/or a plurality of the WLANs. Accordingly, various modifications and changes may be made to the embodiments without departing from the broadest spirit and scope of the present invention as set forth in the claims that follow. The specification and drawings are accordingly to be regarded in an illustrative rather than restrictive sense.

What is claimed is:

1. A method for locating a wireless communication device, comprising:
   determining a first location of the wireless communication device, the determining including:
      initiating each of three access points to transmit a respective signal to the wireless communication device,
      receiving at each of the three access points an acknowledgment signal from the wireless communication device, the acknowledgment signal including a first signal strength of the respective signals from the three access points,
      determining at each of the three access points a second signal strength of the acknowledgment signal, and
      determining the first location as a function of at least one of the first signal strength and the second signal strength; and
   determining a second location of the wireless communication device, the determining of the second location including:
      directing from each of the three access points a respective beam to the first location,
      receiving at each of the three access points a return signal from the wireless communication device a signal,
      determining the second location of the wireless communication device as a function of the return signal.

2. The method as recited in claim 1, wherein the first location corresponds to a coarse location.

3. The method as recited in claim 1, wherein the second location corresponds to a fine location.

4. The method as recited in claim 1, wherein the determining of the second location includes determining a time of arrival of the return signal at each of the three access points.

5. The method as recited in claim 1, wherein the determining of the first location is performed by a server in communication with the three access points.

6. The method as recited in claim 1, wherein the determining of the second location is performed by a server in communication with the three access points.

7. The method as recited in claim 1, further comprising:
   storing at the three access points a signal strength of a prior transmission from the wireless communication device, wherein the determining of the first location is based on the signal strength of the prior transmission.

8. The method as recited in claim 1, further comprising:
   storing at the three access points a signal strength information received in a prior transmission from the wireless communication device, wherein the determining of the first location is based on the signal strength of the prior transmission.

9. The method as recited in claim 1, wherein the wireless communication device includes one of a PDA, a laptop computer, a network card, and a handheld computer.

10. The method as recited in claim 1, wherein the directing of the respective beam includes providing to the three access points instructions from a server for steering the beam from each of the three access points.

11. The method as recited in claim 1, wherein the directing of the respective beam includes providing to the three access points the first location, wherein the three access points determines the manner by which to direct their respective beams based on the first location.

12. A system for locating a wireless communication device, comprising:
- means for determining a first location of the wireless communication device, the means for determining including:
- means for initiating each of three access points to transmit a respective signal to the wireless communication device,
- means for receiving at each of the three access points an acknowledgment signal from the wireless communication device, the acknowledgment signal including a first signal strength of the respective signals from the three access points,
- means for determining at each of the three access points a second signal strength of the acknowledgment signal, and
- means for determining the first location as a function of at least one of the first signal strength and the second signal strength; and
- means for determining a second location of the wireless communication device, the means for determining the second location including:
- means for directing from each of the three access points a respective beam to the first location,
- means for receiving at each of the three access points a return signal from the wireless communication device a signal,
- means for determining the second location of the wireless communication device as a function of the return signal.

13. The system as recited in claim 12, wherein the first location corresponds to a coarse location.

14. The system as recited in claim 12, wherein the second location corresponds to a fine location.

15. The system as recited in claim 12, wherein the means for determining the second location includes means for determining a time of arrival of the return signal at each of the three access points.

16. The system as recited in claim 12, wherein the means for determining the first location includes a server in communication with the three access points.

17. The system as recited in claim 12, wherein the means for determining the second location includes a server in communication with the three access points.

18. The system as recited in claim 12, further comprising:
- means for storing at the three access points a signal strength of a prior transmission from the wireless communication device, wherein the determining of the first location is based on the signal strength of the prior transmission.

19. The system as recited in claim 12, further comprising:
- means for storing at the three access points a signal strength information received in a prior transmission from the wireless communication device, wherein the determining of the first location is based on the signal strength of the prior transmission.

20. A system for determining a first location and a second location of a wireless communication device, comprising:
- at least three access points;
- a processing device in communication with the at least three access points, wherein the processing device initiates in the at least three access points a first location operation and a second location operation, wherein:
- in the first location operation:
  - each of the three access points transmit a respective signal to a wireless communication device,
  - each of the three access points receive an acknowledgment signal from the wireless communication device, the acknowledgment signal including a first signal strength of the respective signals from the three access points,
  - each of the three access points determines a second signal strength of the acknowledgment signal, and
  - the first location is determined as a function of at least one of the first signal strength and the second signal strength; and
- in the second location operation:
  - each of the three access points directs a respective beam to the first location,
  - each of the three access points receives a return signal from the wireless communication device a signal,
  - the second location of the wireless communication device is determined as a function of the return signal.

* * * * *